United States Patent
Inamura et al.

(12) United States Patent    (10) Patent No.: US 6,221,322 B1
Inamura et al.    (45) Date of Patent: Apr. 24, 2001

(54) STRONTIUM NITRATE AND METHOD FOR MANUFACTURING SAME

(75) Inventors: Tatsumi Inamura; Atsushi Tsukada; Kazunari Suzuki; Choju Nagata, all of Tokyo (JP)

(73) Assignees: Dowa Mining Co., LTD; Dowa Hightech Co., LTD, both of Tokyo (JP)

( * ) Notice: Subject to any disclaimer, the term of this patent is extended or adjusted under 35 U.S.C. 154(b) by 0 days.

(21) Appl. No.: 09/196,158

(22) Filed: Nov. 20, 1998

(30) Foreign Application Priority Data

Nov. 27, 1997 (JP) .................................................. 9-326040

(51) Int. Cl.$^7$ .................................................. C01B 21/48
(52) U.S. Cl. ........................... 423/162; 23/304; 423/166; 423/395
(58) Field of Search .................................. 423/395, 162, 423/166; 23/304

(56) References Cited

U.S. PATENT DOCUMENTS

| | | | |
|---|---|---|---|
| 1,475,492 | * 11/1923 | Krase et al. ............................. | 23/304 |
| 1,922,283 | * 8/1933 | Dering ................................... | 23/304 |
| 2,158,162 | * 5/1939 | Turner .................................. | 423/395 |
| 3,065,052 | 11/1962 | Bundy et al. . | |

FOREIGN PATENT DOCUMENTS

| | | | |
|---|---|---|---|
| 0 025 237 A1 | 3/1981 | (EP) . | |
| 0025237 | * 3/1981 | (EP) ................................. | 423/395 |
| 0 379 876 A1 | 8/1990 | (EP) . | |
| 171320 | 12/1945 | (JP) . | |
| 57-209820 | 12/1982 | (JP) . | |
| B2-58-35935 | 8/1983 | (JP) . | |
| 2-233520 | 9/1990 | (JP) . | |
| 9-77516 | 3/1997 | (JP) . | |
| 550810 | * 8/1979 | (RU) ................................. | 423/395 |
| 1065343 | * 1/1984 | (RU) ................................. | 423/395 |

OTHER PUBLICATIONS

Riedel–de ha e n Catalogue: Laboratory Chemicals (1997) p 1063 xp–0020 95925 article No. 31633 (No Month).
ZH.PRIKL.KHIM 59 (12) (1986) P2679–2683 (No Month).
Kagaku Binran [Chemistry Handbook], Kiso–hen [Standard Edition], 1984, (No Month).

Cotton Wilkinson, Kiso Muki Kagaku [Basic Inorganic Chemistry], 1979, p. 231, (No Month).

Riedel–de Haën Catalogue: Laboratory Chemicals, 1997: Article No. 31633, XP002095925, p. 1063, (No Month).

Chemical Abstracts, vol. 106, No. 18, May 4, 1987, Columbus, Ohio, US; abstract No. 148238, Sadokhina, L.A. et al.: "Physicochemical principles for the removal of barium from strontium nitrate by crystallization", XP002095926, abstract, & ZH. Prikl. Khim. (Leningrad) (1986), 59(12), 2679–83 Coden: Zpkhab; ISSN: 0044–4618, (No Month).

Database WPI, Section Ch, Week 9530, Derwent Publication Ltd., London, GB; Class E33, AN 95–229754, XP002095927, & RU 2 024 432 C, (Neobast Local Enterp), Dec. 15, 1994, abstract.

Database WPI, Section Ch, Week 9517, Derwent Publication Ltd., London, GB; Class C04, AN 95–129596, XP002095928, & SU 1 693 847 a (Goldinov A L), Jul. 30, 1994, abstract.

* cited by examiner

*Primary Examiner*—Wayne Langel
(74) *Attorney, Agent, or Firm*—Oliff & Berridge, PLC

(57) ABSTRACT

Low-cost, high-purity strontium nitrate that is low in Ba, Na, Ca, Cr, and other impurities and that is suitable for use in airbags or the like is provided. High-purity strontium nitrate having a Ba content of 0.01 wt % or lower, an Na content of 0.005 wt % or lower, a Ca content of 0.01 wt % or lower, a Cr content of less than 0.001 wt %, and a purity of 99.5 wt % or higher is produced by a manufacturing method comprising a first step for performing crystallization by adding nitric acid to an aqueous solution obtained by dissolving a strontium compound as a starting material, a second step for separating the resulting crystals, a third step for crystallizing the resulting separated solution, and a fourth step for separating the resulting crystals.

27 Claims, No Drawings

STRONTIUM NITRATE AND METHOD FOR MANUFACTURING SAME

BACKGROUND OF THE INVENTION

1. Field of the Invention

The present invention relates to strontium nitrate and a method for manufacturing the same, and more particularly is aimed at providing strontium nitrate that has a low impurity content and that is suitable (as an oxidant) for gas generation in automotive airbags.

2. Description of the Related Art

Strontium nitrate emits red light when ignited, and is thus predominantly used as a material for smoke candles. Strontium nitrate is used in small amounts as a lighting material for briquettes, as well as an intermediate starting material for semiconductors, fluorescents, and the like.

In another recent application, the compound* has come to be used as an oxidant for gas generation in automotive airbags due to this compound's low deliquescence or hygroscopicity, relative stability against heat, and the like. Metal oxidizers have been used in the past as oxidants for the gas-generating agents of airbags, but these oxidizers cannot necessarily be considered as having adequate deliquescence, hygroscopicity, stability against heat, or the like, and a transition to strontium nitrate has gradually come about, as described above. The following methods can be cited as examples of methods for manufacturing such strontium nitrate.

Methods for manufacturing strontium nitrate after strontium carbonate is first manufactured as a starting material include methods in which strontium carbonate is manufactured by reductive roasting using celestite (principal component: $SrSO_4$) as a starting material

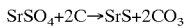

$$SrSO_4 + 2C \rightarrow SrS + 2CO_2$$

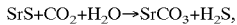

$$SrS + CO_2 + H_2O \rightarrow SrCO_3 + H_2S,$$

and methods for manufacturing strontium carbonate by the soda process

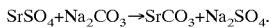

$$SrSO_4 + Na_2CO_3 \rightarrow SrCO_3 + Na_2SO_4.$$

The strontium carbonate ($SrCO_3$) obtained by these methods is dissolved in dilute nitric acid, impurities are removed from the resulting strontium nitrate solution, and the product is then concentrated, cooled, and crystallized until a crystal film forms, yielding strontium nitrate tetrahydrate ($Sr(NO_3)_2 \cdot 4H_2O$).

It is commonly known that an anhydrous salt can be obtained when a strontium nitrate solution from which impurities have been removed is concentrated in an evaporator, crystals are allowed to precipitate under heat, the precipitate is centrifuged while heated, and the product is dried at 100° C. or higher.

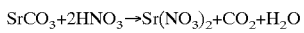

$$SrCO_3 + 2HNO_3 \rightarrow Sr(NO_3)_2 + CO_2 + H_2O$$

(Kagaku Binran [Chemistry Handbook], Oyo Kagaku-hen, 1986)

Japanese Unexamined Patent Application 57-209820 discloses a method for obtaining strontium nitrate containing 0.89 wt % Ca, 0.44 wt % Ba, 6.6 ppm Mg, 37 ppm $SiO_2$, 0.43 ppm Na, 5 ppm Al, and no more than 0.1 ppm Fe by a technique in which the natural mineral celestite (containing strontium sulfate as its principal component) is mixed, heated, and reacted with crystal water-containing calcium nitrate; the reaction mixture is then brought into contact with water; the strontium nitrate of the reaction product and the unreacted calcium nitrate are extracted with water; the extract is heated to evaporate off the water; crystals of strontium nitrate are allowed to precipitate; the precipitate is separated from the mother liquor; and the product is washed with water and dried.

In addition, a method for removing impurities from the resulting strontium nitrate is described, for example, in Japanese Examined Patent Application 58-35935, which discloses a method in which heavy metals or magnesium are/is precipitated and separated out as hydroxides by adding calcium hydroxide to a raw strontium nitrate solution containing heavy metals or magnesium, and the pH is adjusted to 7–8.

According to Japanese Examined Patent Application 58-35935, celestite ($SrSO_4$), which is a naturally occurring strontium sulfate, is used as a starting material; strontium carbonate precipitated by the double decomposition technique

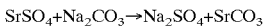

$$SrSO_4 + Na_2CO_3 \rightarrow Na_2SO_4 + SrCO_3$$

is separated from the reaction mixture and washed; and an adhered sodium sulfate solution is removed, yielding a cake of raw strontium carbonate.

Typically, such raw strontium carbonate has the following dry composition: 86% $SrCO_3$, 8% $CaCO_3$, 2% $MgCO_3$, 2% $Na_2SO_4$, 1.5% inert matter, 1% $BaCO_3$, 0.5% $BaSO_4$, and 0.1% $Na_2CO_3$. A raw strontium carbonate cake is subsequently made into a slurry having a solids content (dry basis) of about 0.5–6%; nitric acid with a concentration of, for example, 69% is added; the slurry* is allowed to react with the nitric acid at about 40–90° C.; nitric acid is added until carbon dioxide stops forming; excess acidity is then corrected by adding a small amount of a moistened cake of strontium carbonate; and the pH is adjusted to about 3–4.

Calcium hydroxide is subsequently added to adjust the pH to about 7–8 and to precipitate the heavy metal or magnesium hydroxides present in the nitrate solution. The precipitate is filtered at 40–100° C., yielding a raw strontium nitrate solution. Typically, the resulting raw strontium nitrate solution has the following composition: 39% $Sr(NO_3)_2$, 6% $Ca(NO_3)_2$, 1% $NaNO_3$, 1% $Mg(NO_3)_2$, and 0.4% $Ba(NO_3)_2$, with water constituting the balance.

This raw strontium nitrate solution is crystallized by vaporization at 60–90° C., yielding solid strontium nitrate. The product* is separated and washed, and the adhered mother liquor is removed and dried. Typically, the anhydrous strontium nitrate crystals thus obtained have the following composition: 98% $Sr(NO_3)_2$, 1.0% $Ba(NO_3)_2$, 0.35% $Ca(NO_3)_2$, 350 ppm $NaNO_3$, and 550 ppm $Mg(NO_3)_2$.

Japanese Unexamined Patent Application 9-77516 discloses another method for removing impurities. In this application, the following method is described as an intermediate step of a method for manufacturing high-purity strontium carbonate: nitric acid is added to a strontium nitrate-containing aqueous solution (starting material) to precipitate the strontium nitrate, and the precipitated strontium nitrate is separate into a liquid and solid fractions, yielding strontium nitrate with a low content of Na, K, Fe, Ni, U, Th, Ca, and other impurities.

The following impurities are contained in this strontium nitrate starting material: 270 ppm Ca, 95 ppm Na, 12 ppm K, 1 ppm Fe, 1 ppm Ni, 0.1 ppb U, and 0.1 ppb Th. Nitric acid with an equivalent acid concentration of 5.3 N is added to this aqueous solution, the solution* is first heated to 80°

C. and then cooled to room temperature, and the precipitated strontium nitrate is separated into a solid and liquid fractions. The following impurities are contained in the recrystallized strontium nitrate: 4 ppm Ca, 3 ppm Na, less than 1 ppm K, less than 0.1 ppm Fe, less than 0.1 ppm Ni, less than 0.03 ppb U, and less than 0.03 ppb Th.

In addition, the following method for purifying strontium nitrate is disclosed in U.S. Pat. No. 3,065,052: an aqueous solution of strontium nitrate containing barium impurities is prepared, this solution is gradually adjusted to at least the neutral range with nitric acid, the adjusted solution is mixed with a chromic acid solution to produce a strongly acidic solution, a strontium hydroxide solution is gradually added to the resulting solution containing a nitrate and an acid to adjust the pH to 11 while this solution is agitated, this pH is kept unchanged for several minutes to allow the barium impurities to precipitate as barium chromate, the solution is then filtered to remove the barium chromate, nitric acid is subsequently added to the filtrate to gradually bring the pH to about 1 while the filtrate is boiled, and the filtrate is then evaporated to precipitate strontium nitrate crystals, yielding strontium nitrate having the following average composition: 99.85% $Sr(NO_3)_2$, 0.05% $Ba(NO_3)_2$, 0.004% $NaNO_3$, $Ca(NO_3)_2$ (undetected), and the like.

In addition, the following quality is stipulated by JIS for anhydrous strontium nitrate reagents, in terms of metal elements: no more than 0.0005 wt % heavy metals (as Pb), no more than 0.0005 wt % Fe, no more than 0.02 wt % Ca, no more than 0.01 wt % K, and no more than 0.02 wt % Na.

The above-described conventional strontium nitrate contains large amounts of Ba, Ca, and Na. It is thus impossible to conclude that adequate deliquescence or hygroscopicity can be achieved when such conventional strontium nitrate is used as an oxidant for airbags. The explosive characteristics of gas generation in airbags will therefore be unstable if the airbags are stored for a long time under adverse conditions, absorbing moisture. In addition, the presence of Ba in strontium nitrate makes it likely that barium will remain as an oxide following gas generation in an airbag.

Another concern is that Cr and other impurities will be dispersed in the environment after gas generation in an airbag, rendering manufacturing methods based on conventional chromic acid treatments disadvantageous in that Cr will remain as an impurity in strontium nitrate.

In addition, methods aimed at removing barium as chromates cause contamination of strontium nitrate with chromium and require that wastewater treatment be performed to remove chromic acid, a compound whose use is subject to strict regulations.

In addition, starting materials often contain $NH_3$, and traces of $NH_3$ (for example, about 10 wt ppm) are sometimes contained in the final product. Particle diameters are poorly controlled. pH values of water solutions are nonuniform because of inadequate removal of mother liquors during purification. In addition, high moisture content sometimes results.

Traces of $NH_3$ may therefore be present in strontium nitrate; the mean particle size of a powder may be too small, or there may be too many fine particles; and the pH of a product dissolved in water may be too high or too low. Thus deliquescence and hygroscopicity may become more pronounced, and reactivity might increase and poor stability result, making it more difficult to manufacture airbags, inflators, or the like. Other drawbacks include poor thermal stability or other characteristics of the final product. In addition, explosion characteristics are sometimes inadequate when the moisture content is high.

A strong need therefore existed for developing a method for manufacturing high-purity strontium nitrate which is largely devoid of the above-described drawbacks, in which the content of barium, sodium, calcium, chromium, and ammonia is reduced, whose particle size and pH are controlled, which has a low moisture content, and which is suitable for use as an oxidant for automotive airbags or the like; and for manufacturing strontium nitrate for which no chromic acid wastewater treatments are required.

SUMMARY OF THE INVENTION

Aimed at overcoming the above-described shortcomings, the first invention resides in strontium nitrate having a Ba content of 0.01 wt % or lower, an Na content of 0.005 wt % or lower, and a Ca content of 0.01 wt % or lower.

The second invention resides in strontium nitrate having a Cr content of less than 0.001 wt %.

The third invention resides in strontium nitrate having a Ba content of 0.01 wt % or lower, an Na content of 0.005 wt % or lower, a Ca content of 0.01 wt % or lower, and a Cr content of less than 0.001 wt %.

The fourth invention resides in granular strontium nitrate having a Ba content of 0.05 wt % or lower, an Na content of 0.005 wt % or lower, a Ca content of 0.01 wt % or lower, and a Cr content of less than 0.001 wt %, wherein this strontium nitrate has a mean particle size of 200 $\mu$m or greater, a content of less than 1 wt % for a particle size of 44 $\mu$m or less, and a content of less than 1 wt % for a particle size greater than 840 $\mu$m.

The fifth invention resides in the strontium nitrate according to the fourth invention, wherein this strontium nitrate has an $NH_3$ content of less than 0.0001 wt %.

The sixth invention resides in the strontium nitrate according to the fourth invention, wherein this strontium nitrate is such that an aqueous solution obtained by dissolving 5 g of the strontium nitrate in 100 g of water has a pH of 5–9.

The seventh invention resides in the strontium nitrate according to the fourth invention, wherein this strontium nitrate has a moisture content of 0.1 wt % or lower.

The eight invention resides in the strontium nitrate according to the fourth invention, wherein this strontium nitrate has a purity of 99.5 wt % or higher.

The ninth invention resides in a method for manufacturing strontium nitrate comprising: a first step for adding at lest one compound selected from the group consisting of nitric acid, sulfuric acid, and sulfates to an aqueous solution containing strontium nitrate as a starting material, and crystallizing a substance containing impurity compounds; a second step for separating out the impurity-containing substance crystallized in the first step from this solution, yielding a separated solution; a third step for crystallizing a strontium nitrate-containing substance from the separated solution obtained in the second step; and a fourth step for separating the strontium nitrate-containing substance crystallized in the third step from this solution, and recovering and drying this substance.*

The tenth invention resides in the method for manufacturing strontium nitrate according to the ninth invention, wherein this method for manufacturing strontium nitrate comprises adding nitric acid to obtain 0.1–5 mol/dm$^3$ free nitric acid.

The eleventh invention resides in the method for manufacturing strontium nitrate according to the ninth invention, wherein this method for manufacturing strontium comprises setting the temperature of the aqueous solution to 80° C. or lower, and adding the sulfuric acid or sulfate in an amount of 0.5–5.0 mol per mole of Ba contained in the aqueous solution.

The twelfth invention resides in the method for manufacturing strontium nitrate according to the ninth invention, wherein this method for manufacturing strontium nitrate comprises obtaining as a result of the third step precipitated particles with a mean particle size of 200 µm or greater by setting the temperature of the separated solution obtained in the second step to 30° C. or higher, and concentrating the product at a vaporization rate of no more than 3 vol %/min, in terms of the amount of vaporized water in relation to the amount of the aqueous solution saturated with strontium nitrate.

The thirteenth invention resides in the method for manufacturing strontium nitrate according to the ninth invention, wherein this method for manufacturing strontium nitrate comprises including in the first step a procedure for adjusting the pH of the strontium nitrate-containing aqueous solution to 7 or higher, and vaporizing $NH_3$ by heating.

The fourteenth invention resides in the method for manufacturing strontium nitrate according to the thirteenth invention, wherein this method for manufacturing strontium nitrate comprises including in the pH adjustment a procedure for adding at least one compound selected from the group consisting of strontium hydroxide and potassium hydroxide to the strontium nitrate-containing solution, and adjusting the pH.

The fifteenth invention resides in the method for manufacturing strontium nitrate according to the ninth invention, wherein this method for manufacturing strontium nitrate comprises including in the third step a procedure for adjusting the pH of the separated solution obtained in the second step to 7 or higher, and vaporizing $NH_3$ by heating.

The sixteenth invention resides in the method for manufacturing strontium nitrate according to the fifteenth invention, wherein this method for manufacturing strontium nitrate comprises including in the [pH] adjustment a procedure for adding at least one compound selected from the group consisting of strontium hydroxide and potassium hydroxide to the separated solution obtained in the second step, and adjusting the pH.

The seventeenth invention resides in the method for manufacturing strontium nitrate according to the ninth invention, wherein this method for manufacturing strontium nitrate comprises including in the third step a procedure for adjusting the 4–10 the pH of the separated solution obtained during the second step.

The eighteenth invention resides in the method for manufacturing strontium nitrate according to the seventeenth invention, wherein this method for manufacturing strontium nitrate comprises including in the pH adjustment a procedure for adding at least one compound selected from the group consisting of strontium carbonate, strontium hydroxide, and potassium hydroxide to the separated solution obtained in the second step, and adjusting the pH.

The nineteenth invention resides in the method for manufacturing strontium nitrate according to the ninth invention, wherein this method for manufacturing strontium nitrate comprises washing the substance recovered in the fourth step with an organic solvent or an aqueous solution saturated with strontium nitrate.

The twentieth invention resides in the method for manufacturing strontium nitrate according to the ninth invention, wherein this method for manufacturing strontium nitrate comprises including in the fourth step a procedure for separating and recovering the strontium nitrate-containing substance crystallized in the third step from this solution, and drying the strontium nitrate to a moisture content of 0.1 wt % or lower.

The strontium nitrate obtained in accordance with the above-described invention and characterized by a Ba content of 0.01 wt % or lower, an Na content of 0.005 wt % or lower, a Ca content of 0.01 wt % or lower, and a Cr content of less than 0.001 wt % can be used as an oxidant having low deliqescence or hygroscopicity and excellent long-term storability or explosive characteristics for gas generation in an airbag. In addition, strontium nitrate containing less than 0.001 wt % Cr can be used as an environmentally clean oxidant (first to third inventions).

Granular strontium nitrate whose Ba content exceeds 0.01 wt % but is no more than 0.05 wt % can still be used as an environmentally clean oxidant that has adequate explosive characteristics, low deliquescence and hygroscopicity, and excellent long-term storability or explosive characteristics for gas generation in airbags as long as the mean particle size thereof is 200 µm or greater, preferably 600 µm or less, and still preferably 400 µm or less, the content of particles measuring 44 µm or less is less than 1 wt %, and the content of particles measuring more than 840 µm is less than 1 wt % (fourth invention). It is also possible to obtain a product with even better deliquescence, hygroscopicity, reactivity, explosive characteristics, heat stability, and long-term storability if the $NH_3$ content is less than 0.0001 wt % or the pH is 5–9 (pH corresponding to a water solubility of 5 wt %) for an aqueous solution obtained by dissolving 5 g of strontium nitrate in 100 g of distilled water from which $CO_2$ has been removed by boiling (fifth and sixth inventions).

In addition, exceptional deliqunescence, hygroscopicity, reactivity, explosive characteristics, heat stability, and long-term storability are obtained when the moisture content is 0.1 % wt % or lower or when purity is 99.5 wt % or higher, and preferably 99.8 wt % (seventh and eighth inventions). Purity in this case is measured by the following sulfuric acid technique. Sulfuric acid is added to a prescribed amount of strontium nitrate dissolved in water, in an amount greater than that needed to convert all the strontium nitrate to strontium sulfate, and a precipitate is deposited. Purity in his case is defined as the proportion of the weight of strontium nitrate (calculated based on the weight of the precipitate on the assumption that the entire deposited precipitate is strontium sulfate) in relation to the weight of initially dissolved strontium nitrate, expressed as a percentage.

Strontium nitrate according to the first to eighth inventions is obtained by a method for manufacturing strontium nitrate comprising a first step for adding at least one compound selected from the group consisting of nitric acid, sulfuric acid, and sulfates to an aqueous solution containing strontium nitrate as a starting material, and crystallizing a substance containing impurity compounds; a second step for separating out the impurity-containing substance crystallized in the first step from this solution, yielding a separated solution; a third step for cyrstallizing a strontium nitrate-containing substance from the separated solution obtained in the second step; and a fourth step for separating the strontium nitrate-containing substance crystallized in the third step from this solution, and recovering and drying this substance (ninth invention).

Here, nitric acid is added during the aforementioned first step such that the amount of free nitric acid is 0.1–5 mol/dm$^3$ (tenth invention), and preferably 0.8–3.5 mol/dm$^3$. The reason that this range has been selected is that adding less than 0.1 mol/dm$^3$ makes it impossible to obtain strontium nitrate crystals of adequate barium content as a result of the first crystallization procedure, allowing barium to be carried over to the next step, whereas adding more than 5 mol/dm$^3$ brings about a marked reduction in the yield of strontium nitrate during the first crystallization procedure.

When sulfuric acid or a sulfate is added, the addition, while depending on the quality of the staring material, is commonly 0.5–5.0 mol, and preferably 1.5–5.4 mol, per mole Ba. Adding less than 0.5 mol allows the balance of the 0.5 mol of Ba to remain in the aqueous solution as barium nitrate, making it impossible to bring the concentration of the Ba impurity below the required level. On the other hand, adding more than 5.0 mol converts strontium to strontium sulfate and brings about a reduction in the yield of strontium nitrate. The added compound may be sulfuric acid or, in the case of a sulfate, potassium sulfate, sodium sulfate, ammonium sulfate, or the like, of which sulfuric acid or potassium sulfate, and sulfuric acid in particular, is preferred because it does not easily form impurities during subsequent steps. The temperature of the strontium nitrate solution during such addition should be set to 80° C. or lower (eleventh invention), and preferably to 30° C. or lower. Strontium nitrate solubility is only slightly dependent on temperature, but lower temperatures are still preferred because barium sulfate solubility increases with an increase in temperature. Sulfuric acid or a sulfate should preferably be added at a rate of 5 mol/min or lower per mole of Ba in the aqueous solution. A higher addition rate prevents the sulfuric acid or sulfate from adequately dispersing throughout the solution, lowering the Ba removal ratio.

In addition, granular strontium nitrate with suppressed reactivity and mean particle size of 200 μm or greater can be obtained in the above-described third step by setting to 30° C. or higher the temperature of the separated solution obtained in the above-described second step, and concentrating the product at a vaporization rate of no more than 3 vol %/min, expressed as the amount of vaporized water in relation to the amount of the aqueous solution saturated with strontium nitrate (twelfth invention).

Another feature of the aforementioned first step is that the pH of the strontium nitrate-containing aqueous solution is adjusted to 7 or higher, and preferably 8 or higher, and NH$_3$ is vaporized by heating to obtain strontium nitrate with a low NH$_3$ content (thirteenth invention). Any neutralizing agent can be used to adjust the pH, but strontium hydroxide or potassium hydroxide, and strontium hydroxide in particular, is preferred because it does not easily form impurities that affect the characteristics during subsequent steps (fourteenth invention). NH$_3$ can be evaporated off before or after the crystallization of the substance containing impurity compounds, but, in terms of cost, performing vaporization prior to crystallizaton is preferred from the standpoint of consumption of pH adjustors. Because a higher heating temperature is preferred, this temperature should preferably be set to 50° C. or higher, and particularly 90° C. or higher.

Similarly, strontium nitrate with a low NH$_3$ content can be obtained during the above-described third step by adjusting the pH of the strontium nitrate-containing aqueous solution to 7 or higher, and preferably 8 or higher, and evaporating NH$_3$ by heating (fifteenth invention). strontium hydroxide or potassium hydroxide, and strontium hydroxide in particular, is preferred for such pH adjustment because it does not easily form impurities that affect the characteristics during subsequent steps (sixteenth invention). Because of higher removal efficiency, it is more preferable for NH$_3$ to be vaporized off prior to the crystallization of the strontium nitrate-containing substance. The other conditions are the same as in the thirteenth and fourteenth inventions.

In addition, the deliquescence or hygroscopicity of strontium nitrate can be reduced during the above-described third step, and handling can be facilitated during the manufacture of gas-generating agents for airbags because the pH achieved when strontium nitrate has been dissolved in water can be brought to 5–9 by adjusting to 4–10 the pH of the separated solution obtained during the above-described second step (seventh invention). Strontium carbonate, strontium hydroxide, or potassium hydroxide, and strontium carbonate or strontium hydroxide in particular, is preferred for such pH adjustment because it does not easily form impurities that affect the characteristics during subsequent steps (eighteenth invention).

In addition, the substance (crystalline strontium nitrate) obtained in the above-described fourth step is washed with an organic solvent or an aqueous solution saturated with strontium nitrate, and hygroscopicity can be reduced and the handling during manufacture facilitated by reducing the content of impurities in the strontium nitrate thus obtained and adjusting the pH of the strontium nitrate crystals themselves to a level lying in the vicinity of the neutral region (nineteenth invention). Various organic solvents may be used, but ethanol, methanol, or another alcohol is preferred, and ethanol is particularly preferred.

Strontium nitrate that can be used as a clean oxidant with better explosive characteristics, lower deliquescence or hygroscopicity, and excellent long-term storability can also be obtained during the above-described fourth step by separating and recovering the strontium nitrate-containing substance crystallized during the aforementioned third step from this solution, preferably bringing the moisture content to 3 wt % or lower, and drying the dewatered strontium nitrate to a moisture content of 0.1 wt % or lower.

DESCRIPTION OF THE PREFERRED EMBODIMENTS

As a result of painstaking research into the issues described below, the inventors devised the present invention upon successfully manufacturing strontium nitrate with a low content of the ba, Na, Ca, and Cr impurities.

Specifically, a study on the solubility of Sr(NO$_3$)$_2$, Ba(NO$_3$)$_2$, NaNO$_3$, and Ca(NO$_3$)$_2$ in water has shown that when the mass (in grams) of an anhydrous compound contained in 100 g of saturated solution is converted to the mass (in grams) of the anhydrous compound in 100 g of water, the corresponding contents will be as follows.

At 80° C.: 97.6 g Sr(NO$_3$)$_2$, 27.2 g Ba(NO$_3$)$_2$, 148.1 g NaNO$_3$, 344.2 g Ca(NO$_3$)$_2$

At 25° C.: 78.9 g Sr(NO$_3$)$_2$, 10.2 g Ba(NO$_3$)$_2$, 91.1 g NaNO$_3$, 138.0 g Ca(NO$_3$)$_2$ (Source: Kagaku Binran [Chemistry Handbook], Kisohen [Standard Edition], 1984))

For example, the impurities of raw strontium nitrate (Sr(NO$_3$)$_2$), which is a starting material used in the present invention, are Ba (0.2 wt %), Na (0.1 wt %), and Ca (0.1 wt. %), which, when converted to nitrates, become Ba(NO$_3$)$_2$ (0.38 wt %), NaNO$_3$ (0.37 wt %), Ca(NO$_3$)$_2$ (0.41 wt %), and Sr(NO$_3$)$_2$ (the remaining 98.8 wt %). It can be readily surmised that a solution saturated with strontium nitrate will be obtained if 100 g of such raw anhydrous strontium nitrate is added per 100 g of water, and the system is heated to a temperature slightly above 80° C. In addition, the impurities contained therein are $Ba(NO_3)_2$ (0.38 g), $NaNO_3$ (0.37 g, and $Ca(NO_3)_2$ (0.41 g), and, based on their solubility at 80° C., these are probably dissolved in water as well.

Because of a difference in solubility, $Sr(NO_3)_2$ is expected to precipitate in an amount of 19.9 g if a solution saturated with strontium nitrate is cooled to 25° C. About 20% of the strontium nitrate as starting material is precipitated.

It is estimated that the impurities contained in the solution do not precipitate because their content is below the solubility limit at 25° C.

Because strontium nitrate can be precipitated without being cooled to 25° C. if contained moisture is evaporated out, it is expected that extremely pure strontium nitrate devoid of precipitated impurities can still be obtained during the precipitation of up to about 20% of the strontium nitrate starting material.

The inventors, however, obtained completely unexpected results as a result of their experiments. Surprisingly, barium nitrate, which has lower solubility than does strontium nitrate, is present in the precipitated strontium nitrate.

In view of this, the inventors arrived at the present invention as a result of an additional series of exhaustive tests and studies into the possibility of precipitating a larger amount of barium nitrate in the initial precipitate.

Specifically, the inventors came across a report stating that nitrates of Sr and Ba are anhydrates and that the latter can be precipitated if fuming nitric acid is added to a cooled aqueous solution (Cotton Wilkinson, Kiso Muki Kagaku [Basic Inorganic Chemistry], 1979, 231 pages), and arrived at the present invention by combining these facts with the above-described results and performing additional quantitative experiments.

The present invention resides in an excellent manufacturing method which is completely counterintuitive from the standpoint of impurity removal during conventional strontium nitrate manufacture, and in which impurities are removed by setting the pH to a very low level with nitric acid and separating the initial precipitate normally expected to be free from impurities.

In addition, there is no contamination of strontium nitrate with chromium, as has been the case in the past, and the need to perform a wastewater treatment for the chromic acid being used is dispensed with.

Strontium nitrate, strontium carbonate, and other water-soluble strontium compounds have been cited as examples of the starting materials used in the present invention, but these are not limited to the above-cited compounds in any particular way.

The aforementioned starting material (water-soluble strontium compound) is dissolved in an acid, water, or the like to obtain a strontium nitrate-containing aqueous solution as a starting material. Taking into account impurity removal steps, strontium nitrate or strontium carbonate is preferred for use as the starting material.

When strontium nitrate is used as the strontium compound, it may be an anhydrate, a tetrahydrate, or a mixture thereof.

In this case, a commercially available product containing the following impurities in $Sr(NO_3)_2$ can be used as the starting material strontium nitrate of sufficient purity:

Ba 0.1–1 wt %
Na 0.1–1 wt %
Ca 0.1–1 wt %
Cr 0.01–0.005 wt %

Despite a somewhat lower efficiency, it is also acceptable to use strontium nitrate containing Ba, Na, Ca, and Cr in greater amounts. This applies to the purity of other strontium compounds.

Sulfuric acid, hydrochloric acid, nitric acid, or the like can be used for dissolution, but because nitric acid is used as the acid added in order to perform post-dissolution purification, the same nitric acid as that used for dissolution is preferred for use.

Expressed in terms of $Sr(NO_3)_2$, the concentration of strontium nitrate in the strontium nitrate-containing aqueous solution being prepared is commonly 400–900 g/dm³, and preferably 600–800 g/dm³. The reason that these ranges are selected is that a concentration below 400 g/dm³ is unsuitable because it allows only a small amount to be dissolved, adversely affecting production efficiency, whereas a concentration above 900 g/dm³ allows crystals to form in pipelines or the like, impairing production.

Expressed as the acid concentration of nitric acid in excess of that constituting strontium nitrate or the like, the concentration of free nitric acid in the strontium nitrate-containing aqueous solution following the addition of nitric acid should preferably b 0.1–5.0 mol/dm³. In this case, a concentration below 0.1 mol/dm³ makes it impossible to remove Ba because Ba-containing $Sr(NO_3)_2$ crystals cannot be obtained during the first step. A concentration in excess of 5 mol/dm³ is unsuitable because of a reduction in the strontium nitrate yield.

The temperature of the strontium nitrate-containing aqueous solution being prepared should preferably be 30° C. or higher. In this case, a temperature below 30° C. is unsuitable because it lowers strontium solubility and reduces strontium crystallization.

Nitric acid is added during or before concentration under heat (or reduced pressure), and the precipitate is partially crystallized. An alternative is to heat the system (or to reduce its pressure), to vaporize the water, to add nitric acid immediately after crystals have appeared, and to crystallize the product. The nitric acid may be added at any step, but the temperature of the solution being cooled following heating should preferably be 20–60°C. A temperature below 20° C. lowers the strontium nitrate yield, whereas a temperature over 60° C. makes it impossible to adequately obtain strontium nitrate crystals.

The precipitated strontium salt of nitric acid resulting from partial deposition should preferably constitute 5–50 weight parts per 100 weight parts of strontium nitrate in the initially contained strontium nitrate. The reason is that an amount less than 5 weight parts is unsuitable because of the inability to adequately remove Ba, whereas an amount greater than 50 weight parts is unsuitable because of a lower yield. A sulfate or sulfuric acid is added under the same conditions as those described with reference to the eleventh and twelfth inventions.

In the second step, the precipitated barium sulfate that accompanies strontium sulfate, or the precipitated strontium salt of nitric acid obtained by partial deposition in such a manner is separated into liquid and solid fractions, yielding a filtrate containing dissolved strontium nitrate.

Such separation into liquid and solid fractions can be accomplished by, but is not limited to, filtration separation, gravity filtration, pressure filtration (based on the use of filter presses or the like), centrifugal separation, or the like.

In the third step, the filtrate containing dissolved strontium nitrate and resulting from the solid-liquid separation is heated or placed under reduced pressure, contained water is vaporized off to achieve concentration, and the strontium nitrate is then crystallized. In this case, the temperature during heating and concentration should preferably be 30° C. or higher. The reason is that a temperature below 30° C. is unsuitable because of the formation of tetrahydrates.

In addition, the precipitated strontium salt of nitric acid thus deposited should preferably constitute 40–90 weight parts per 100 weight parts of strontium in the initially dissolved strontium compound. The reason is that an amount less than 40 weight parts is unsuitable because of a lower yield, whereas an amount greater than 90 weight parts is unsuitable because Ca, Na, and the like are contained as impurities. In addition, crystals having a mean particle size of 200 $\mu$m or greater, preferably 600 $\mu$m or less, and still preferably 400 $\mu$m or less, are deposited during the third step by allowing crystallization to proceed slowly over an extended period of time. Concentration should preferably be carried out at a vaporization rate of no more than 3 vol %/min, in terms of the amount of vaporized watering relation to the amount of the aqueous solution saturated with strontium nitrate. Vacuum evaporation may also be appropriately carried out. The corresponding temperature should be 30° C. or higher, and preferably 50–70° C., because hydrated strontium nitrate forms below 30° C. The resulting crystals are separated into liquid and solid fractions, dewatered, and dried during the subsequent fourth step, and any fines that are present are then removed by classification (JIS #200 sieve, #250 sieve, or the like). This is because hygroscopicity increases, reactivity becomes more prominent, explosive characteristics are adversely affected, or manufacture of gas-generating agents is impaired when the mean particle size is less than 200 $\mu$m or when the particle size is 44 $\mu$m or less.

The strontium salt of nitric acid obtained by such additional deposition is then separated into liquid and solid fractions during the fourth step, yielding strontium nitrate crystals. Such separation into liquid and solid fractions can be accomplished by, but is not limited to, filtration separation, gravity filtration, pressure filtration (based on the use of filter presses or the like), centrifugal separation and filtration, or the like. IN this case, the dewatering time of a filter press, centrifugal separator, or the like should preferably be 30 minutes or longer in order to adequately remove the mother liquor. The process* should preferably be controlled such that the corresponding moisture content remains at 3 wt % or lower. The reason for this is to prevent the content of impurities from being increased, or the pH from being raised or lowered, by the adhered mother liquor (filtrate) on the surface of strontium nitrate. Another reason is to ensure adequate* efficiency during the drying step or to prevent crystals from aggregating during drying.

The solution saturated with strontium nitrate should also be washed with ethanol or another organic solvent in order to adequately remove the adhered filtrate from the surfaces of strontium nitrate crystals after the product* has been separated into liquid and solid fractions.

The dewatered strontium nitrate is dried until its moisture content reaches 0.1 wt % or less. Preferably, the drying temperature is 100° C. or higher, and, ideally, the drying is conducted at a reduced pressure or in a vacuum. Any fines or coarse particles (large crystals) present in the resulting strontium nitrate are removed by classification with a sieve or the like.

A material such as Teflon or quartz glass, or a material coated with these should preferably be selected in order to avoid contamination as the material for the containers or equipment for performing distillation steps or wet purification steps such as dissolution, filtration, and crystallization.

The purity of the strontium nitrate thus obtained, expressed as the content of various impurities, is as follows.

Ba less than 0.0001 wt % (below the detection limit)-0.01 wt %

Na less than 0.0001 wt % (below the detection limit)-0.005 wt %

Ca less than 0.0001 wt % (below the detection limit)-0.01 wt %

Cr less than 0.001 wt % (below the detection limit)

The strontium nitrate resulting from the application of the present invention and having a Ba content of 0.01 wt % or lower, an Na content of 0.005 wt % or lower, and a Ca content of 0.01 wt % or lower was mixed with the principal ingredients of a gas-generating agent for airbags, combustion rate was measured as an explosive characteristic, and it was found that such explosive characteristics were adequate and remained stable following accelerated tests involving prolonged storage.

In addition, strontium nitrate having a Ba content of 0.01 wt % or lower was suitable as a gas-generating agent for airbags with low barium compound generation. Similarly, strontium nitrate having a Cr content of less than 0.001 wt % was suitable as a gas-generating agent for airbags from the environmental standpoint as well.

The presence of $NH_3$ increases hygroscopicity, brings about instability, and has an adverse effect on explosive characteristics or on the process for manufacturing gas-generating agents. To remove the $NH_3$, strontium hydroxide ($Sr(OH)_2$) or potassium hydroxide (KOH) is added to the strontium nitrate-containing aqueous solution of the first step or to the separated solution obtained during the second step in the third step, and the ingredients are heated to preferably 50° C. or higher, and still preferably 90° C. or higher, at a pH of 7–10, and preferably 8–9. This temperature should preferably be maintained for 2 hours or longer. $NH_3$ is thus vaporized off.

In addition, hygroscopicity can be kept sufficiently low, stability can be enhanced, and adequate explosive characteristics can be maintained even when the Ba content is raised to 0.05 wt % in a case in which all of the following conditions are satisfied at a Ba content of over 0.01 wt %: the $NH_3$ content is less than 0.0001 wt %, the mean particle size is 200 $\mu$m or greater, and the particle content is less than 1 wt % for a particles measuring 44 $\mu$m or less and less than 1 wt % for particles measuring more than 840 $\mu$m. In this case, the explosive characteristics become unstable and hygroscopicity becomes more prominent with an increase in the amount of particles measuring 44 $\mu$m or less. The same results are yielded by an increase in the excessively coarse particles measuring more than 840 $\mu$m.

The method for manufacturing strontium nitrate in accordance with the aspects of the present invention will now be described with reference to practical examples.

Practical Example 1

Strontium nitrate ($Sr(NO_3)_2$) containing as impurities 0.2 wt % Ba, 0.1 wt % Na, 0.1 wt % Ca and 0.005 wt % Cr was introduced as a starting material in an amount of 5.0 kg together with 4.5 kg of water into a 15-dm$^3$ Teflon tank, the ingredients* were dissolved and agitated, 2.0 kg of commercial nitric acid (60 wt %) was added, and the system was agitated while cooled to 25° C. to crystalline strontium nitrate containing a large amount of Ba as an impurity (first step).

The resulting strontium nitrate crystals were separated into liquid and solid fractions with a filter press, and 0.90 kg of precipitate containing Ba was separated. These crystals were analyzed and were found to have a high Ba concentration (1.1 wt %) (second step).

The resulting filtrate was subsequently boiled at atmospheric pressure and concentrated at a vaporization rate of 4 vol %/min. Strontium nitrate was crystallized for the second time (third step). The resulting crystals were separated into liquid and solid fractions with a filter press. In this case, washing was performed using ethanol, and the resulting crystals were washed while being prevented from redissolving, dewatered to a moisture content of 5.8 wt %, and dried to a moisture content of 0.2 wt % following dewatering. Crystallized strontium nitrate was recovered in an amount of 3.0 kg (fourth step).

According to a chemical analysis of the recovered strontium nitrate, the Ba content was 0.003 wt %, the Na content 0.001 wt %, the Ca content 0.002 wt %, the Cr content less than 0.001 wt % (below the detection limit), the mean particle size 170 μm, the content of particles measuring 44 μm or less 5 wt %, the content of particles measuring more than 840 μm 1.5 wt %, and the purity (determined by the sulfuric acid technique) 99.8% wt %. This strontium nitrate was mixed with the principal ingredients of a gas-generating agent for airbags as an oxidizer for the gas-generating agents or airbags. combustion rate was measured as an explosive characteristic, and it was found that deliquescence and hygroscopicity were low, appropriate heat stability was maintained, and the explosive characteristics were adequate and remained stable following accelerated tests involving prolonged storage.

Practical Example 2

Strontium nitrate ($Sr(NO_3)_2$) containing as impurities 0.5 wt % Ba, 0.1 wt % Na, 0.2 wt % Ca and 0.005 wt % Cr was introduced as a starting material in an amount of 3.5 kg together with 5.0 kg of water into a 15-$dm^3$ Teflon tank, the ingredients were dissolved and agitated, 2.2 kg of commercial nitric acid (60 wt %) was added, and the system was agitated while cooled to 25° C. to crystallize strontium nitrate containing a large amount of Ba as an impurity (first step).

The resulting strontium nitrate crystals were separated into liquid and solid fractions with a filter press, and a Ba-containing precipitate was separated in an amount of 0.80 kg. These crystals were analyzed and were found to have a high Ba concentration (2.16 wt %) (second step).

The resulting filtrate was subsequently boiled at atmospheric pressure and concentrated at a vaporization rate of 4.5 vol %/min. Strontium nitrate was crystallized for the second time (third step). The resulting crystals were separated into liquid and solid fractions with a filter press. In this case, washing was performed using a saturated solution of strontium nitrate, and the resulting crystals were washed while being prevented from redissolving, dewatered to a moisture content of 5.9 wt %, and dried to a moisture content of 0.2 wt % following dewatering. Crystallized strontium nitrate was recovered in an amount of 2.4 kg (fourth step).

According to a chemical analysis of the recovered strontium nitrate, the Ba content was 0.009 wt %, the Na content 0.001 wt %, the Ca content 0.003 wt %, the Cr content less than 0.001 wt %, (below the detection limit), the mean particle size 150 μm, the content of particles measuring 44 μm or less 6 wt %, the content of particles measuring more than 840 μm 1.5 wt %, and the purity (determined by the sulfuric acid technique) 99.8 wt %. The explosive characteristics of this strontium nitrate were measured in the same manner as in Practical Example 1, and it was found that, as in Practical Example 1, deliquescence and hygroscopicity were low, appropriate heat stability was maintained, and the explosive characteristics were adequate and remained stable following accelerated tests involving prolonged storage.

Practical Example 3

In the first step, strontium carbonate (containing as impurities 0.5 wt % Ba, 0.1 wt % Na, 0.1 wt % Ca, 0.005 wt % Cr, and 0.01 wt % $NH_3$) was introduced in an amount of 3.0 kg together with 5.0 kg of water and 4.3 kg of 60-wt % nitric acid into a 15-$dm^3$ Teflon tank, the ingredients were dissolved, 2.0 kg of 60-wt % nitric acid was further added, and the system was agitated while cooled to 25° C.

In the second step, the strontium nitrate crystals were separated into liquid and solid fractions with a filter press, and Ba-containing crystals were obtained in an amount of 1.0 kg. The Ba content was 1.4 wt %.

In the third step, strontium hydroxide was introduced into the separated solution obtained in the second step, the pH was raised to 5, the temperature was set lower than in Practical Example 2, and the solution* was concentrated at a vaporization rate of 0.5 vol %/min at 60° C. and a reduced pressure to crystallize the strontium nitrate.

In the fourth step, the strontium nitrate deposited in the third step was filtered and dewatered for 30 minutes with a centrifugal dehydrator, yielding strontium nitrate with a moisture content of 1.4 wt %. The product was washed using a saturated solution of strontium nitrate and dried in a vacuum for 10 hours at 120° C., yielding 2.8 kg of strontium nitrate with a moisture content of 0.1 wt %. The impurities were as follows.

| | |
|---|---|
| Ba | 0.036 wt % |
| Na | 0.0003 wt % |
| Ca | 0.003 wt % |
| Cr | Less than 0.001 wt % (below detection limit) |
| $NH_3$ | 0.001 wt % |
| Mean particle size: | 240 μm |
| Particles measuring between 44 and 840 μm (more than 44 μm but no more than 840 μm) | 99.5 wt % |
| pH at 5-wt % water solubility | 4.8 |
| Purity according to sulfuric acid technique | 99.9 wt % |

Similar to Practical Examples 1 and 2, deliquescence and hygroscopicity were low, appropriate heat stability was maintained, and the explosive characteristics were adequate and remained stable following accelerated tests involving prolonged storage. In addition, the product was easy to handle during the manufacture of a gas-generating agent.

Practical Example 4

Strontium nitrate (containing as impurities 0.4 wt % Ba, 0.1 wt % Na, 0.2 wt % Ca, 0.005 wt % Cr, and 0.005 wt % $NH_3$) was introduced in an amount of 4.0 kg together with 4.3 kg of water into a 15-$dm^3$ Teflon tank, the ingredients were dissolved, 1.8 kg of 60-wt % nitric acid was further added, and the system was agitated and crystallized while cooled to 25° C. (first step).

In the second step, the strontium nitrate crystals (0.70 kg of Ba-containing crystals; Ba: 2.14 wt %) were removed by being separated into liquid and solid fractions with a filter press.

Strontium carbonate was subsequently introduced into the separated solution thus obtained, the pH was raised to 5, and the solution was concentrated at a vaporization rate of 0.5 vol %/min at 55° C. and a reduced pressure to crystallize the strontium nitrate (third step).

In the fourth step, the strontium nitrate deposited in the third step was filtered and dewatered for 30 minutes with a centrifugal dehydrator, yielding strontium nitrate with a moisture content of 1.2 wt %. The product was washed using a saturated solution of strontium nitrate and dried in a vacuum in the same manner as in Practical Example 3, yielding 2.6 kg of strontium nitrate with a moisture content of 0.1 wt %. The impurities were as follows.

| | |
|---|---|
| Ba | 0.038 wt % |
| Na | 0.0005 wt % |
| Ca | 0.004 wt % |
| Cr | Less than 0.001 wt % (below detection limit) |
| $NH_3$ | 0.0005 wt % |
| Mean particle size: | 260 μm |
| Particles measuring between 44 and 840 μm | 99.8 wt % |
| pH at 5-wt % water solubility | 4.9 |
| Purity according to sulfuric acid technique | 99.8 wt % |

Similar to Practical Example 3, deliquescence and hygroscopicity were low, appropriate heat stability was maintained, and the explosive characteristics were adequate and remained stable following accelerated tests involving prolonged storage. In addition, the product* was easy to handle during the manufacture of a gas-generating agent.

Practical Example 5

Strontium nitrate (containing as impurities 0.3 wt % Ba, 0.1 wt % Na, 0.2 wt % Ca, 0.005 wt % Cr, and 0.01 wt % $NH_3$) was introduced in an amount of 4.0 kg together with 5.0 kg of water into a 15-$dm^3$ Teflon tank, dissolved, and then cooled to 25° C. 75 g of 25-wt % sulfuric acid was added using a pump over a period of 30 minutes under agitation.

Because the above-described reactions had yielded nitric acid, the system was neutralized with potassium hydroxide, the pH was raised to 9.0, and the temperature was raised to 90° C. and maintained for 1 hour (first step). The product* was then filtered with a filter press (second step), then placed under reduced temperature and pressure, and concentrated at a vaporization rate of 0.5 vol %/min (third step). The crystals obtained by such concentration were filtered and dewatered with a centrifugal dehydrator. The dewatering was continued for 30 minutes or more, yielding strontium nitrate with a moisture content of 0.9 wt %. The product was washed using a saturated solution of strontium nitrate and dried in a vacuum in the same manner as in Practical Example 3, yielding 3.0 kg of strontium nitrate with a moisture content of 0.05 wt % (fourth step). The impurities were as follows.

| | |
|---|---|
| Ba | 0.035 wt % |
| Na | 0.0002 wt % |
| Ca | 0.001 wt % |
| $NH_3$ | Less than 0.0001 wt % (below detection limit) |
| Mean particle size: | 280 μm |
| Particles measuring between 44 and 840 μm | 100 wt % |
| pH at 5-wt % water solubility | 6.9 |
| Purity according to sulfuric acid technique | 99.8 wt % |

In comparison with Practical Examples 1–4, deliquescence and hygroscopicity were lower, better heat stability was maintained, and the explosive characteristics were better and remained even more stable following accelerated tests involving prolonged storage. In addition, the product was extremely easy to handle during the manufacture of a gas-generating agent.

Practical Example 6

Strontium carbonate (containing as impurities 0.4 wt % Ba, 0.1 wt % Na, 0.3 wt % Ca, and 0.01 wt % $NH_3$) was introduced in an amount of 3.0 kg together with 5.0 kg of water and 4.3 kg of 60-wt % nitric acid into a 15-$dm^3$ Teflon tank, dissolved, and cooled to 25° C. 100 g of 25-wt % sulfuric acid was added using a pump over a period of 25 minutes under agitation (first step).

The product was subsequently neutralized with potassium hydroxide, the pH was raised to 9.5, and the temperature was increased to 90° C. and maintained for 2 hours (first step). The product was then filtered with a filter press (second step), placed under reduced temperature and pressure, and concentrated at 60° C. and a vaporization rate of 0.5 vol %/min (third step). The resulting crystals were filtered and dewatered with a centrifugal separator. The dewatering was performed for 50 minutes, yielding strontium nitrate with a moisture content of 0.5 wt %. The product was washed using a saturated solution of strontium nitrate and dried in a vacuum in the same manner as in Practical Example 3, yielding 3.0 kg of strontium nitrate crystals with a moisture content of 0.04 wt % (fourth step).

The impurities were as follows.

| | |
|---|---|
| Ba | 0.031 wt % |
| Na | 0.0002 wt % |
| Ca | 0.005 wt % |
| Cr | Less than 0.001 wt % (below detection limit) |
| $NH_3$ | Less than 0.0001 wt % (below detection limit) |
| Mean particle size: | 240 μm |
| Particles measuring between 44 and 840 μm | 99.8 wt % |
| pH at 5-wt % water solubility | 7.3 |
| Purity according to sulfuric acid technique | 99.8 wt % |

In comparison with Practical Examples 1–4 and 5, deliquescence and hygroscopicity were lower, exceptional heat stability was achieved, and the explosive characteristics were better and remained extremely stable following accelerated tests involving prolonged storage. In addition, the product* was extremely easy to handle during the manufacture of a gas-generating agent.

In the above-described practical examples, ICP-AEF was used to measure the content of Ba, Ca, or Cr; atomic absorption spectrometry was used for Na measurements; and a technique in which NaOH was introduced, the system was distilled, and the distilled water was measured with ion electrodes was used for $NH_3$ measurements. In addition, a dry microtrack technique was used, either alone or together with a sieve technique, to measure the particle size. Furthermore, dissolution pH was measured by dissolving 5 g of strontium nitrate in 100 g of distilled water from which carbon dioxide had been removed by boiling. In addition, the moisture content was measured by an infrared moisture meter.

Comparative Example 1

Strontium nitrate ($Sr(NO_3)_2$) containing an impurities 0.2 wt % Ba, 0.1 wt %, Na, 0.1 wt % Ca and 0.005 wt % Cr was introduced as a starting material in an amount of 5.0 kg together with 7.0 kg of water into a 15-$dm^3$ Teflon tank, the ingredients* were dissolved and agitated, 60 g of commercial nitric acid (60 wt %) was added, and the system* was agitated while cooled to 25° C. to crystallize strontium nitrate containing Ba as an impurity.

The resulting strontium nitrate crystals were separated into liquid and solid fractions with a filter press, and a Ba-containing precipitate was separated in an amount of 20 g. These crystals were analyzed and were found to have a low Ba concentration (0.4 wt %).

The resulting filtrate was subsequently concentrated, the strontium nitrate was crystallized for the second time, and the resulting crystals were separated into liquid and solid fractions with a filter press. In this case, partial washing was performed using ethanol, and strontium nitrate crystals with a pH of 4 at 5 wt % water solubility were recovered in an amount of 3.5 kg while measures were taken to prevent the resulting crystals from redissolving. The explosive characteristics of this strontium nitrate were measured in the same manner as in Practical Example 1, and it was found that the results* were inferior to those in Practical Example 1, making it impossible to obtain adequate characteristics.

The recovered strontium nitrate was chemically analyzed, and it was found that the Ba content was 0.19 wt %, making the nitrate unsuitable as a starting material for the oxidants used in the gas-generating agents of airbags.

Comparative Example 2

Strontium nitrate ($Sr(NO_3)_2$) containing as impurities 0.2 wt % Ba, 0.1 wt % Na, 0.1 wt % Ca and 0.005 wt % Cr was introduced as a starting material in an amount of 5.0 kg together with 7.0 kg of water into a 15-$dm^3$ Teflon tank, the ingredients were dissolved and agitated at 80° C., the system* was agitated while cooled to 25° C. at a pH of 6 without the addition of the 60-wt % commercial nitric acid, and strontium nitrate containing Ba as an impurity was crystallized.

The resulting strontium nitrate crystals were separated into liquid and solid fractions with a filter press, and a Ba-containing precipitate was separated in an amount of 0.50 kg. These crystals were analyzed and were found to have a low Ba concentration (0.4 wt %).

The resulting filtrate was subsequently concentrated, the strontium nitrate was crystallized for the second time, and the resulting crystals were separated into liquid and solid fractions with a filter press. In this case, partial washing was performed using ethanol, and strontium nitrate crystals were recovered in an amount of 2.7 kg while measures were taken to prevent the resulting crystals from redissolving. The explosive characteristics of this strontium nitrate were measured in the same manner as in Practical Example 1, and it was found that the results were inferior to those in Practical Example 1, making it impossible to obtain adequate characteristics.

The recovered strontium nitrate was chemically analyzed, and it was found that the Ba content was 0.15 wt %, making the nitrate unsuitable as an oxidant for the gas-generating agents of airbags.

As described above, the present invention makes it possible either to perform a crystallization reaction in the presence of free nitric acid within a prescribed range of concentrations in order to deposit barium nitrate-containing strontium nitrate, or to deposit a barium sulfate-containing precipitate by adding sulfuric acid or a sulfate within a prescribed range, and to subsequently remove the resulting precipitate by dividing it into liquid and solid fractions, yielding high-purity strontium nitrate that has a controlled particle size and a low content of $NH_3$, moisture, and impurities (Ba, Na, Ca, and Cr), and hence is suitable as an oxidant for the gas-generating agents of airbags or the like.

What is claimed is:

1. Granular strontium nitrate, having a Ba content of 0.05 wt % or lower, an Na content of 0.005 wt % or lower, a Ca content of 0.01 wt % or lower, and a Cr content of less than 0.001 wt %, wherein said strontium nitrate has a mean particle size of 200 μm or greater, a content of less than 1 wt % for a particle size of 44 μm or less, and a content of less than 1 wt % for a particle size greater than 840 μm.

2. The strontium nitrate according to claim 1, wherein said strontium nitrate has an $NH_3$ content of less than 0.0001 wt %.

3. The strontium nitrate according to claim 1, wherein said strontium nitrate is such that an aqueous solution obtained by dissolving 5 g of said strontium nitrate in 100 g of water has a pH of 5–9.

4. The strontium nitrate according to claim 1, wherein said strontium nitrate has a moisture content of 0.1 wt % or lower.

5. The strontium nitrate according to claim 1, wherein said strontium nitrate has a purity of 99.5 wt % or higher.

6. The strontium nitrate according to claim 2, wherein said strontium nitrate is such that an aqueous solution obtained by dissolving 5 g of said strontium nitrate in 100 g of water has a pH of 5–9.

7. The strontium nitrate according to claim 2, wherein said strontium nitrate has a moisture content of 0.1 wt % or lower.

8. The strontium nitrate according to claim 2, wherein said strontium nitrate has a purity of 99.5 wt % or higher.

9. A method for manufacturing strontium nitrate, comprising:

a first step comprising adding at least one compound selected from the group consisting of nitric acid, sulfuric acid, and sulfates to an aqueous solution containing strontium nitrate as a starting material, and crystallizing a substance containing impurity compounds;

a second step comprising separating out the impurity-containing substance crystallized in said first step from this solution, yielding a separated solution;

a third step comprising crystallizing a strontium nitrate-containing substance from the separated solution obtained in said second step; and a fourth step comprising separating the strontium nitrate-containing substance crystallized in said third step from this solution, and recovering and drying the strontium nitrate-containing substance;

wherein said method for manufacturing strontium nitrate comprises obtaining, as a result of said third step, precipitated particles with a mean particle size of 200 μm or greater by setting the temperature of the separated solution obtained in said second step to 30° C. or higher, and concentrating the product at a vaporization rate of no more than 3 vol %/min, in terms of the amount of vaporized water in relation to the amount of the aqueous solution saturated with strontium nitrate.

10. The method for manufacturing strontium nitrate according to claim 9, wherein said method for manufacturing strontium nitrate comprises adding said nitric acid to obtain 0.1–5 mol/dm$^3$ free nitric acid.

11. The method for manufacturing strontium nitrate according to claim 9, wherein said method for manufacturing strontium nitrate comprises setting the temperature of the aqueous solution to 80° C. or lower, and adding the sulfuric acid or sulfate in an amount of 0.5–5.0 mol per mole of Ba contained in the aqueous solution.

12. The method for manufacturing strontium nitrate according to claim 9, wherein said method for manufacturing strontium nitrate comprises including in said first step a procedure comprising adjusting the pH of the strontium nitrate-containing aqueous solution to 7 or higher, and vaporizing NH$_3$ by heating.

13. The method for manufacturing strontium nitrate according to claim 12, wherein said method for manufacturing strontium nitrate comprises including in said pH adjustment a procedure comprising adding at least one compound selected from the group consisting of strontium hydroxide and potassium hydroxide to said strontium nitrate-containing solution, and adjusting the pH.

14. The method for manufacturing strontium nitrate according to claim 9, wherein said method for manufacturing strontium nitrate comprises including in said third step a procedure comprising adjusting the pH of the separated solution obtained in said second step to 7 or higher, and vaporizing NH$_3$ by heating.

15. The method for manufacturing strontium nitrate according to claim 9, wherein said method for manufacturing strontium nitrate comprises including in said third step a procedure comprising adding at least one compound selected from the group consisting of strontium hydroxide and potassium hydroxide to the separated solution obtained in said second step, adjusting the pH to 7 or higher, and vaporizing NH$_3$ by heating.

16. The method for manufacturing strontium nitrate according to claim 9, wherein said method for manufacturing strontium nitrate comprises including in said third step a procedure comprising adjusting to 4–10 the pH of the separated solution obtained during said second step.

17. The method for manufacturing strontium nitrate according to claim 9, wherein said method for manufacturing strontium nitrate comprises including in said third step a procedure comprising adding at least one compound selected from the group consisting of strontium carbonate, strontium hydroxide, and potassium hydroxide to the separated solution obtained in said second step, and adjusting the pH to 4–10.

18. The method for manufacturing strontium nitrate according to claim 9, wherein said method for manufacturing strontium nitrate comprises washing the substance recovered in said fourth step with an organic solvent or an aqueous solution saturated with strontium nitrate.

19. The method for manufacturing strontium nitrate according to claim 9, wherein said method for manufacturing strontium nitrate includes in said fourth step a procedure comprising recovering the strontium nitrate-containing substance crystallized in said third step by separation from this solution, and drying the strontium nitrate to a moisture content of 0.1 wt % or lower.

20. The method for manufacturing strontium nitrate according to claim 12, wherein said method for manufacturing strontium nitrate comprises including in said third step a procedure comprising adjusting the pH of the separated solution obtained in said second step to 7 or higher, and vaporizing NH$_3$ by heating.

21. The method for manufacturing strontium nitrate according to claim 12, wherein said method for manufacturing strontium nitrate comprises including in said third step a procedure comprising adding at least one compound selected from the group consisting of strontium hydroxide and potassium hydroxide to the separated solution obtained in said second step, adjusting the pH to 7 or higher, and vaporizing NH$_3$ by heating.

22. The method for manufacturing strontium nitrate according to claim 12, wherein said method for manufacturing strontium nitrate comprises including in said third step a procedure comprising adjusting to 4–10 the pH of the separated solution obtained during said second step.

23. The method for manufacturing strontium nitrate according to claim 12, wherein said method for manufacturing strontium nitrate comprises including in said third step a procedure comprising adding at least one compound selected from the group consisting of strontium carbonate, strontium hydroxide, and potassium hydroxide to the separated solution obtained in said second step, and adjusting the pH to 4–10.

24. The method for manufacturing strontium nitrate according to claim 12, wherein said method for manufacturing strontium nitrate comprises washing the substance recovered in said fourth step with an organic solvent or an aqueous solution saturated with strontium nitrate.

25. The method for manufacturing strontium nitrate according to claim 12, wherein said method for manufacturing strontium nitrate comprises including in said fourth step a procedure comprising recovering the strontium nitrate-containing substance crystallized in said third step by separation from this solution, and drying the strontium nitrate to a moisture content of 0.1 wt % or lower.

26. The method for manufacturing strontium nitrate according to claim 12, wherein said method for manufacturing strontium nitrate comprises adding nitric acid to obtain 0.1–5 mol/dm$^3$ free nitric acid.

27. The method for manufacturing strontium nitrate according to claim 12, wherein said method for manufacturing strontium nitrate comprises setting the temperature of the aqueous solution to 80° C. or lower, and adding the sulfuric acid or sulfate in an amount of 0.5–5.0 mol per mole of Ba contained in the aqueous solution.

* * * * *